United States Patent
Cheng et al.

(10) Patent No.: US 9,594,940 B1
(45) Date of Patent: Mar. 14, 2017

(54) FINGERPRINT TEMPLATE COMPRESSION

(71) Applicant: Synaptics Incorporated, San Jose, CA (US)

(72) Inventors: Yi-Hsun E. Cheng, San Jose, CA (US); Kuntal Sengupta, Cupertino, CA (US); Anthony Russo, New York, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/823,824

(22) Filed: Aug. 11, 2015

Related U.S. Application Data

(60) Provisional application No. 62/036,010, filed on Aug. 11, 2014.

(51) Int. Cl.
*G06K 9/48* (2006.01)
*G06K 9/00* (2006.01)

(52) U.S. Cl.
CPC ................. *G06K 9/00006* (2013.01)

(58) Field of Classification Search
None
See application file for complete search history.

(56) References Cited

U.S. PATENT DOCUMENTS

| 5,995,670 | A | 11/1999 | Zabinsky | |
|---|---|---|---|---|
| 7,379,571 | B2 * | 5/2008 | Meier | G06K 9/00067 382/125 |
| 7,697,773 | B1 * | 4/2010 | Bauchspies | H03M 7/40 382/232 |

* cited by examiner

*Primary Examiner* — Brian P Werner
(74) *Attorney, Agent, or Firm* — Leydig, Voit & Mayer, LTD

(57) ABSTRACT

A method and device for compressing a fingerprint template is provided. The fingerprint template is derived from fingerprint image data captured from a sensor. The compressing process initially surveys the fingerprint template to determine one or more starting points for encoding. Subsequently, the compression process selects a starting point from the one or more starting points and proceeds to encode that starting point. After encoding the starting point, the compression process encodes all contours extending from the selected starting point. The above process is repeated until all starting points and their associated contours have been encoded.

12 Claims, 7 Drawing Sheets

FINGERPRINT TEMPLATE COMPRESSION

CROSS-REFERENCE TO RELATED APPLICATIONS

This application claims the benefit of U.S. Provisional Patent Application Ser. No. 62/036,010, filed on Aug. 11, 2014, which is hereby incorporated by reference in its entirety.

FIELD OF THE INVENTION

This disclosure generally relates to biometric recognition, and more particularly to fingerprint template compression.

BACKGROUND OF THE INVENTION

Biometric authentication systems are used for authenticating users of devices incorporating the authentication systems. Biometric sensing technology provides a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particularly portable applications, may require electronic fingerprint sensing systems that are compact, highly reliable, and inexpensive.

Biometric recognition typically involves comparing a match view to a stored enrollment template. When the match view is sufficiently similar to the stored enrollment template, they are considered a match and the biometric in the match view is recognized. It is possible for there to be one or several enrollment templates to check the match view against, and it is also possible for each enrollment template to have one or several views of the same biometric object (for example, corresponding to several partial views of the same fingerprint). Reducing the amount of data needed to store an enrollment template can provide several benefits. For example, limiting the amount of memory needed to store the enrollment template can save cost associated with memory and reduce size. Alternatively, allowing a given amount of memory to store more enrollment template data can improve the recognition process, for example, by allowing a greater number of partial views of a biometric to be stored, providing better coverage of the biometric pattern used in the recognition process. In addition, for increased security, it is often desirable to store the enrollment template locally, such as on the same local device, or even better on the same chip, used to capture the biometric match view and perform the recognition computations, so memory amount is often an important consideration in biometric recognition systems.

In view of the above, there is a need for compression techniques tailored to efficiently store various views of a biometric template. These and other advantages of the disclosure, as well as additional inventive features, will be apparent from the description of the disclosure provided herein.

BRIEF SUMMARY OF THE INVENTION

One embodiment provides a method of compressing a fingerprint template. The fingerprint template is derived from fingerprint image data captured from a sensor. The method includes surveying the fingerprint template to determine one or more starting points. The method further includes selecting a starting point from the one or more starting points. The method further includes encoding the starting point and encoding one or more contours extending from the starting point.

Another embodiment includes a device for compressing a fingerprint template. The fingerprint template is derived from fingerprint image data captured from a sensor. The device includes a processing system configured to perform an encoding process. The encoding process includes surveying the fingerprint template to determine one or more starting points. The encoding process further includes selecting a starting point from the one or more starting points. The encoding process further includes encoding the starting point and encoding one or more contours extending from the starting point.

Yet another embodiment includes a non-transitory computer readable storage device for compressing a fingerprint template. The fingerprint template is derived from fingerprint image data captured from a sensor. The non-transitory computer readable storage device includes computer executable instructions for performing the steps of surveying the fingerprint template to determine one or more starting points; selecting a starting point from the one or more starting points; encoding the starting point; and encoding one or more contours extending from the starting point.

BRIEF DESCRIPTION OF THE DRAWING(S)

The accompanying drawings incorporated in and forming a part of the specification illustrate several aspects of the present invention and, together with the description, serve to explain the principles of the invention. In the drawings:

FIG. 2b is an enhanced image of the fingerprint of FIG. 2a;

FIG. 4b is a thin-ridge version of the fingerprint of FIG. 4a;

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
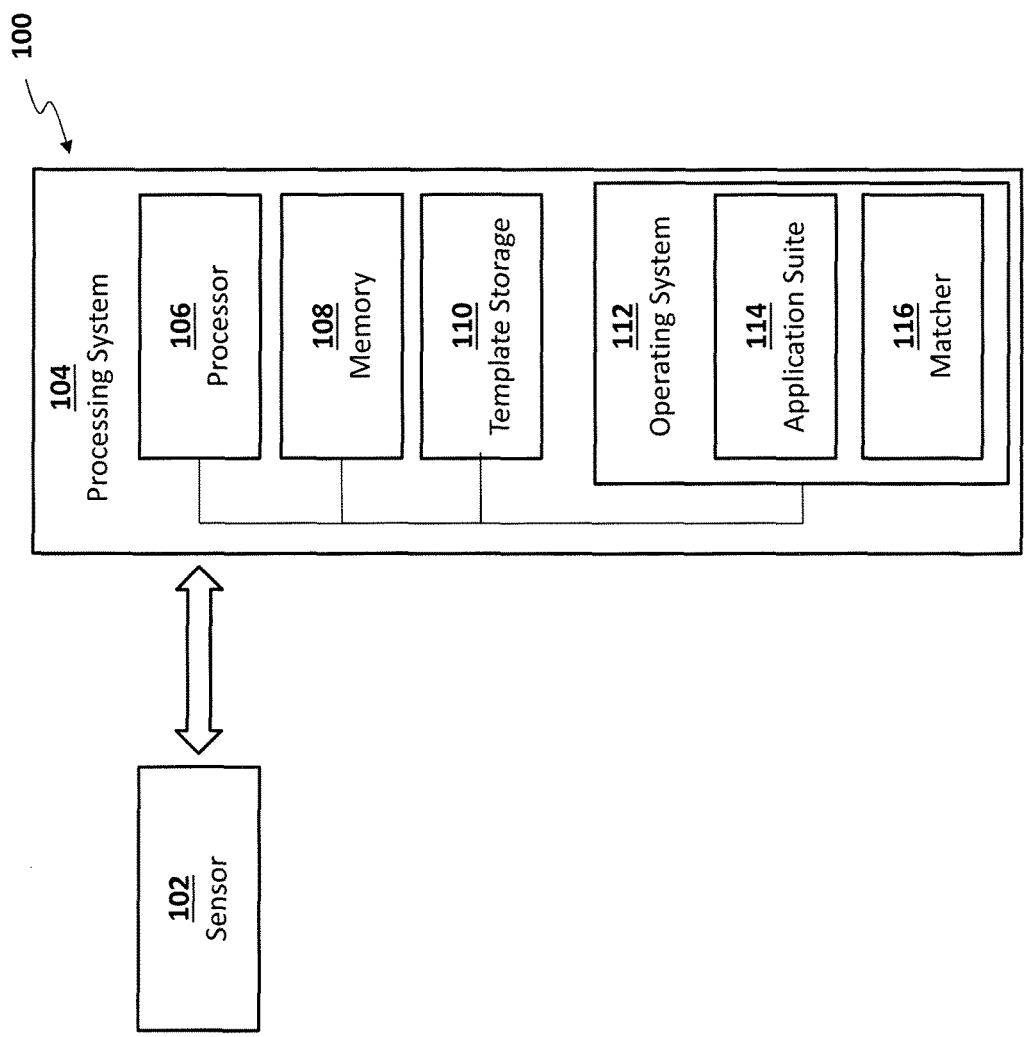
FIG. 1 is a block diagram of an exemplary device that includes an input device and processing system, in accordance with an embodiment of the invention.

Turning now to the figures, FIG. 1 is a block diagram of an electronic system or device 100 that includes an input device such as sensor 102 and processing system 104, in accordance with an embodiment of the invention. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I²C, SPI, PS/2, Universal Serial Bus (USB), Bluetooth, RF, and IRDA.

In certain embodiments, sensor 102 will be utilized as a fingerprint sensor utilizing one or more various electronic fingerprint sensing methods, techniques and devices to capture a fingerprint image of a user. For example, in certain embodiments, the fingerprint sensor 102 may be an optical, capacitive, thermal, pressure, radio frequency (RF) or ultrasonic sensor. In other embodiments, the sensor 102 is configured to detect a vein pattern, such as a finger vein, hand vein, or eye vein pattern, using one or more of the forgoing sensing technologies. In yet further embodiments, the sensor 102 is configured to detect an image of another biometric pattern.

Turning now to the processing system 104 from FIG. 1, basic functional components of the electronic device 100 utilized during capturing and storing a user fingerprint image are illustrated. The processing system 104 includes a processor 106, a memory 108, a template storage 110 and an operating system (OS) 112 hosting an application suite 114 and a matcher 116. Each of the processor 106, the memory 108, the template storage 110 and the operating system 112 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110. The operating system 112 further hosts the application suite 114. The application suite 114 contains applications utilizing data stored on the memory 108 or the template storage 110 or data collected from interface devices such as the sensor 102 to cause the processing system 104 to perform certain functions. For instance, in certain embodiments, the application suite 114 hosts an enroller application, which functions to capture one or more views of the user's biometric pattern, such as the user's fingerprint. The views or fingerprint images generally contain a partial or full image of the user's fingerprint. The enrollment application generally prompts the user to hold or swipe their finger over the sensor 102 for capturing the image. After each requested image is captured, the enrollment application may store the captured image in the template storage 110. In certain embodiments, the enrollment application will cause the data representing the captured image to undergo further processing. For instance, the further processing may be to compress the data representing the captured image such that it does not take as much memory within the template storage 110 to store the image.

In certain embodiments, the application suite 114 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 112 to request the user's fingerprint for an authentication process prior to undertaking a specific action, such as providing access to the OS 112 during a logon process for the electronic device 100. To perform this process, the above listed applications will utilize the matcher 116 hosted by the operating system 112.

Figure 2B:
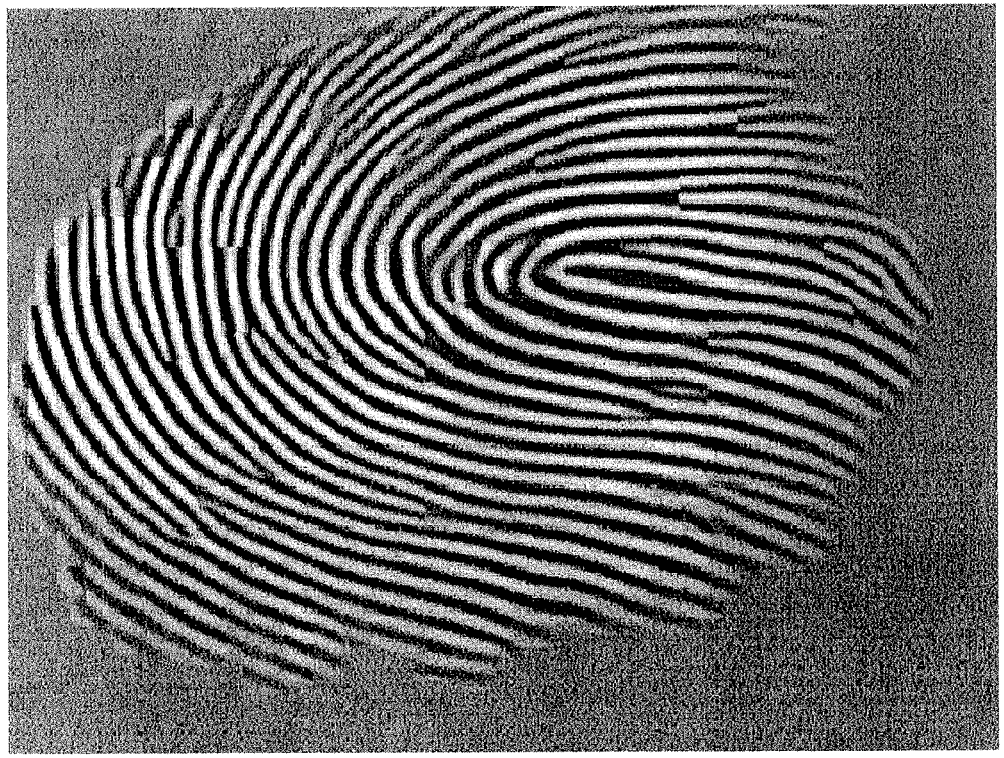
Figure 2A:
FIG. 2a is an image of a fingerprint.

The matcher 116 of the operating system 112 functions to compare an enrollment template of a biometric, e.g., the fingerprint image or images stored in the template storage 110 with a newly acquired fingerprint image or images from a user attempting to access the electronic device 100. In certain embodiments, the matcher 116 will further perform image enhancement functions for enhancing a fingerprint image. An example of the image enhancement function is illustrated in FIGS. 2a and 2b. FIG. 2a illustrates an unenhanced fingerprint image that shows various ridges and minutiae of a fingerprint. As can be seen in FIG. 2a, the image is noisy such that portions of the image are cloudy and the ridges or contours are broken. FIG. 2b illustrates the same fingerprint after the matcher 116 has performed the image enhancement function. As can be seen, the image enhancement function removes much of the noise such that the image is no longer cloudy and the ridges are no longer broken.

Figure 3:
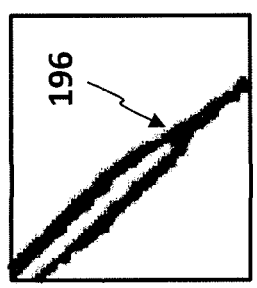
FIG. 3 is an illustration of various types of minutiae points of a fingerprint.
Figure 3:
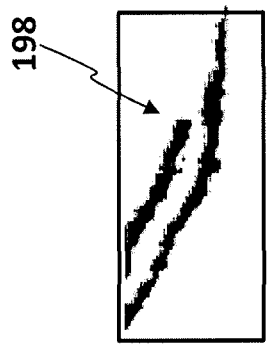

In certain embodiments, the matcher 116 is also configured to perform feature extraction from the fingerprint image or images of the user. Although it is possible in certain situations to perform biometric recognition through comparison of raw biometric images, typically some feature extraction is performed on the raw biometric images so that the comparison between match images and enrollment images is performed with a representation that allows for fast and accurate comparison of discriminative features of the images. In the context of fingerprint recognition, there are a variety of approaches to matching fingerprint images, which include minutia matching and pattern matching schemes. If recognition is performed using minutia matching, the matcher 116 will scan the captured view of the user's fingerprint for minutia. FIG. 3 illustrates prominent types of fingerprint minutia, including a ridge ending 198 and a bifurcation 196. During extraction, the matcher 116 acquires a location and orientation of the minutia from the fingerprint and compares it to previously captured location and orientation information of minutia from the fingerprint image or images in the template storage 110. If certain threshold criteria are met, then the matcher 116 indicates a match, otherwise, no match is indicated.

Alternatively, the matcher 122 may be configured to perform pattern matching. Whereas minutia matching typically needs only the minutia points, with their respective locations and orientations, pattern matching utilizes a more complete representation of the fingerprint. Examples of pattern matching include ridge matching, which compares skeletonized representations of fingerprint contours to each other, and ridge flow matching, which compares contour orientation information to perform matching. If certain threshold criteria are met, then the matcher 122 indicates a match, otherwise, no match is indicated.

Figure 4B:
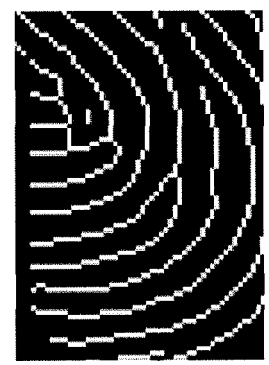
Figure 4A:
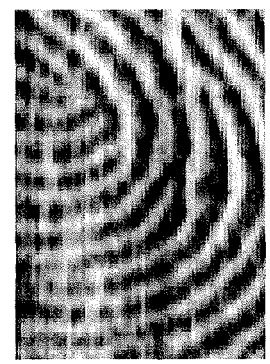
FIG. 4a is an image of a fingerprint.

FIG. 4A depicts an example of a grayscale fingerprint image as captured from a sensor. FIG. 4B depicts a skeletonized (also referred to as "thin-ridge") representation of the fingerprint image in FIG. 4B. FIG. 4B also depicts minutia points overlaid on the skeletonized image. If minutia matching is used, feature extraction may involve conversion of the raw image to the skeletonized image, and derivation of the minutia points from the skeletonized image. In another minutia matching implementation, the minutia points can be extracted from a grayscale image. In a ridge matching implementation, the skeletonized image itself may be used as the features of interest, in which case matching can be performed based on the a difference metric, such as chamfer distance, between ridges in the images. In such a ridge matching implementation, as well as certain other pattern matching implementations, the location and orientation of the minutia points may not be needed for matching.

Regardless of whether minutia matching or pattern matching is utilized by the matcher 116, one or more views of the user's fingerprint(s) must be stored in the template storage 110 during the enrollment process of the application suite 114. In order to facilitate matching, the one or more views of the user's fingerprint(s) must be stored in a way that facilitates matching with fingerprint views captured during the authentication process. In this regard, the location and orientation of minutia and/or ridge curvature and/or ridge density must be stored in the template storage 110.

The template storage 110 provides a limited amount of memory in order to store data related to one or more views of a user's fingerprint(s). In this regard, during the enrollment process, certain techniques will be applied to the data related to the one or more views of a user's fingerprint(s) in order to reduce the amount of memory required to store that data on the template storage 110.

In an embodiment using ridge matching, a thin-ridge (skeletonized) image itself may form a view to be stored in the enrollment template. As an illustrative example, a 4 mm×10 mm in 333 dpi image with 56×144 pixels consumes roughly 8 kbytes of memory. In order to further reduce the amount of memory required to store the data related to the image or images of the user's fingerprint(s), the enrollment application of the processing system 104 may apply data compression techniques. One such data compression technique is run-length encoding. Run-length coding includes coding a starting point, a direction or trajectory for a contour associated with the starting point and a number of pixels that follow that trajectory. In certain embodiments, the starting point may be encoded using two bytes of data, the trajectory may be encoded using two or three bits of data and the number of pixels could be encoded using eight bits of data. The run-length coding technique is useful for straight contours that do not change greatly from the initial coded trajectory. Accordingly, applying run-length encoding for straight ridges of a fingerprint image will provide a high degree of compression. However, for curved contours the curvature affects the accuracy and/or efficiency of the coding of the contour. Accordingly, applying run-length coding for curved ridges of a fingerprint image is not as useful for compression.

Another data compression technique is chain coding. Traditional chain coding schemes are utilized to compress data representing a contour with an unpredictable curvature. In these traditional chain coding schemes, a starting pixel is chosen and coded based on its location. After a starting pixel is chosen, an eight pixel neighborhood of the starting pixel is evaluated for the next pixel in the contour. As there are only eight possibilities for the next pixel in the eight pixel neighborhood, the next pixel can be coded using only 3 bits of data. This process is continued until each pixel in the contour connected to the starting pixel is coded. If we assume the starting pixel takes 2 bytes to encode and the pixel length of the contour is 24 pixels, then the total required memory to encode the contour would be computed as:

$$2 \text{ bytes} + 3 \text{ bits} * \frac{24}{8} = 11 \text{ bytes} \quad (1)$$

Applying chain coding to a fingerprint image does provide a method of compressing the image. In certain instances, the chain code will require more data than run-length coding. Therefore, in certain embodiments, using both run-length coding and chain coding to encode a fingerprint image may be employed. As discussed above, the sensor 102 (see FIG. 1) may capture only images representative of only a portion of a user's fingerprint. Typically, portions of the user's fingerprint on the periphery of the fingerprint include ridges that are substantially straight in orientation. Therefore, these ridges travel at roughly a single trajectory. However, ridges more toward the center of the fingerprint tend to be curved. Therefore, in certain embodiments, fingerprint images representing portions of the fingerprint from the periphery of the fingerprint could be encoded using run-length coding, while portions from the center of the fingerprint could be encoded using chain coding.

Additionally, regarding chain coding, because traditional chain coding was developed for encoding contours with an unpredictable curvature, it is still inefficient for coding a fingerprint image, as there is some predictability to the curvature of a ridge of a fingerprint. By taking each ridge of the fingerprint image as a contour for encoding, a modified chain coding scheme can be utilized that takes advantage of the predictable orientation of the ridges of a typical human fingerprint. Generally, each ridge of a fingerprint has a substantially uniform curvature. Accordingly, if each minutia point of a typical fingerprint is taken as a starting point for the modified chain coding, then each subsequent or next pixel of the ridge attached to that minutia point can be coded using only 2 bits. Assuming similar conditions to the above example with 2 bytes to encode the starting pixel and a contour with a pixel length of 24, then the total required memory to encode the contour would be computed as:

$$2 \text{ bytes} + 2 \text{ bits} * \frac{24}{8} = 8 \text{ bytes} \quad (2)$$

Figure 5:
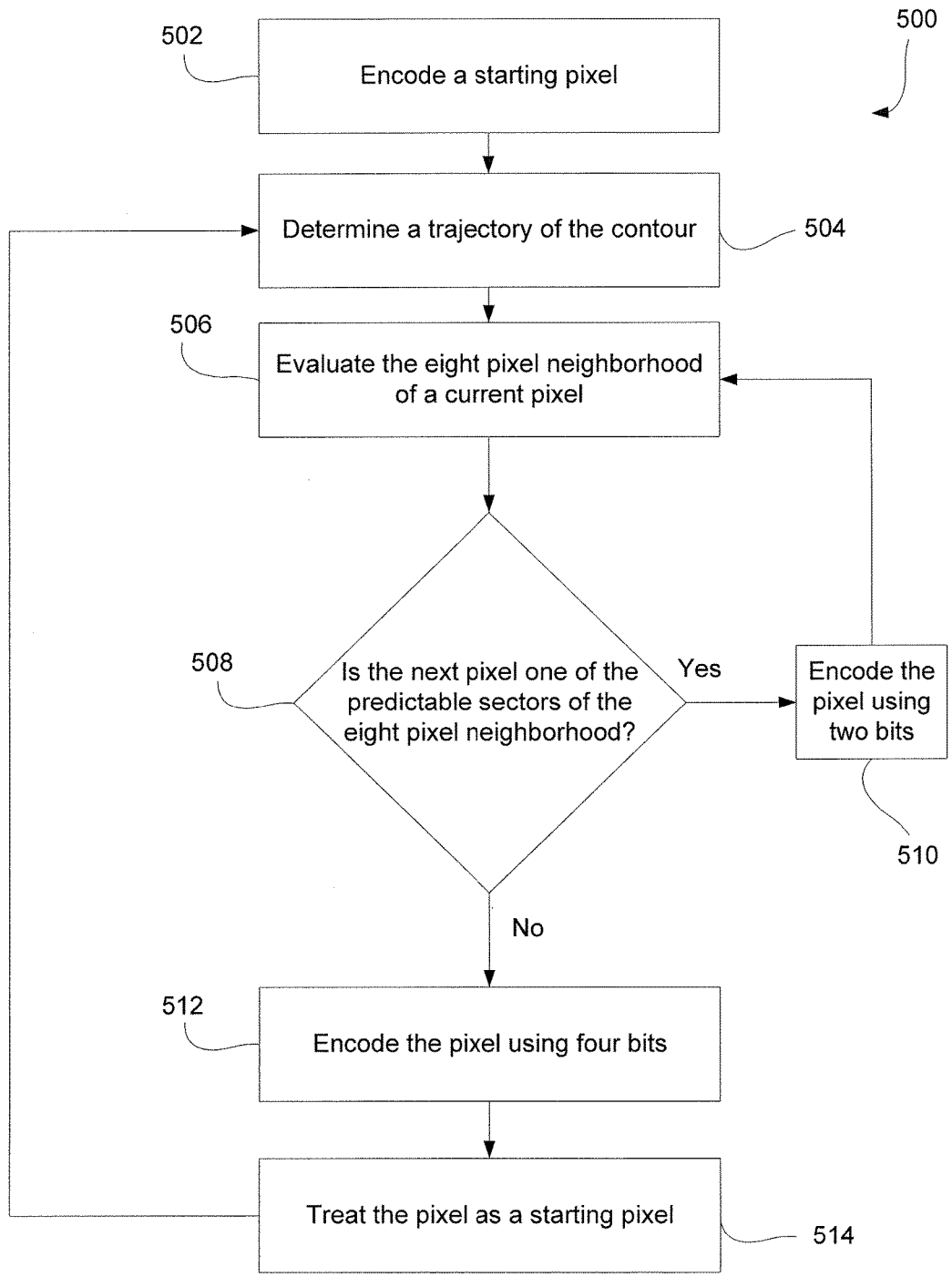
FIG. 5 is a method of encoding an image using a modified chain-coding scheme, in accordance with an embodiment of the invention.

FIG. 5 illustrates such a modified chain coding scheme 500 utilized to compress a fingerprint image, in accordance with a particular embodiment of the invention. FIG. 5 will be discussed in conjunction with FIG. 6, which represents an eight pixel neighborhood of a center pixel for a ridge or in other words a contour 602 being encoded using the modified chain coding scheme of FIG. 5. The modified coding scheme 500 includes an initial step 502 of encoding a starting pixel. As discussed above, the starting pixel represents a minutia point in the fingerprint. For instance, the circles on FIG. 4b of the thin-ridge fingerprint image represent minutia points. Therefore, each minutia point of the image would represent a different starting point. Step 502 selects a starting point and encodes the starting point. In certain embodiments, the starting point requires two bytes of data to encode.

Figure 6:
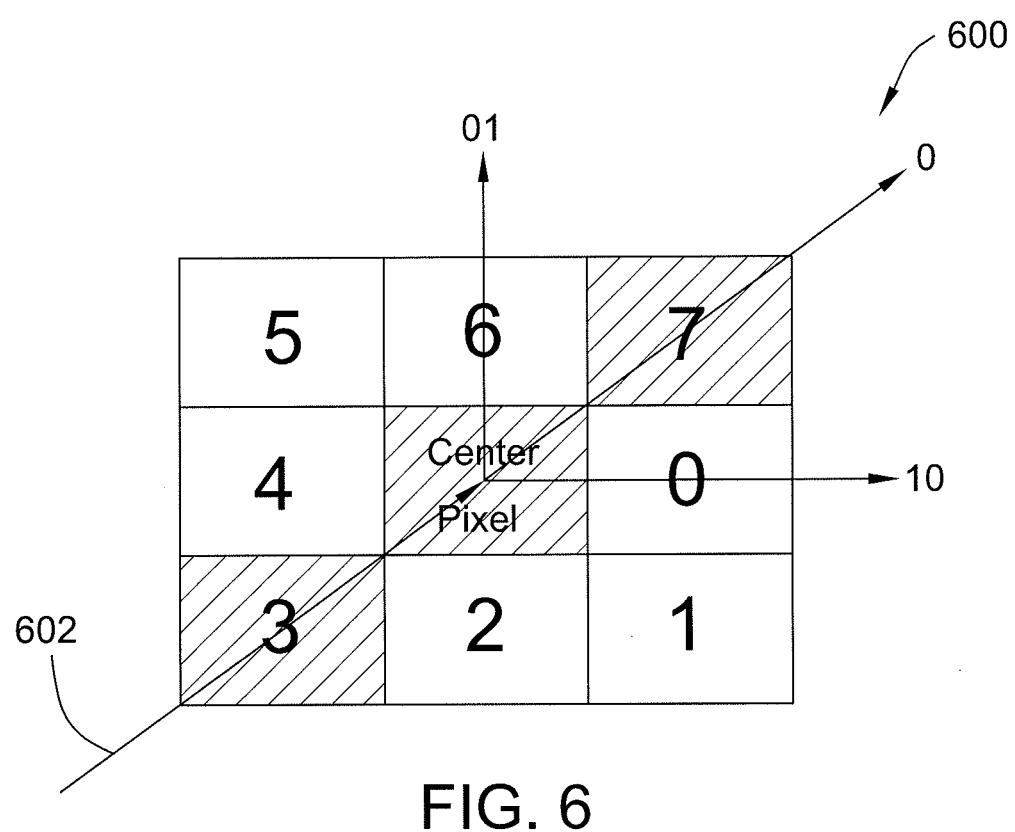
FIG. 6 is an illustration of an eight pixel neighborhood of a pixel of a ridge of a fingerprint, in accordance with an embodiment of the invention.

At step 504, the modified chain coding scheme 500 determines a trajectory of a contour associated with the starting point. Each starting point may have one or more associated contours or ridges. The trajectory of the contour describes a direction that a specific contour travels from the starting point. The trajectory is determined by reviewing an eight-pixel neighborhood of the starting pixel and choosing a contour to encode. As illustrated in FIG. 6, the eight-pixel neighborhood includes eight sectors 0-7 that represent the eight pixels surrounding a center pixel. Whichever sector contains a next pixel to be encoded represents a potential contour to encode. By selecting the next pixel to move to, the modified chain coding scheme 500 will determine a trajectory of the contour. This is because typically, a ridge of a fingerprint contains a uniform curvature such that only a subset of the eight sectors of the eight-pixel neighborhood will contain a next pixel to be encoded. This subset of the eight sectors typically includes only three sectors of the eight different sectors. As illustrated in FIG. 6, contour 602 leaves the center pixel sector and next enters sector 7. However, based on typical fingerprint patterns, it is likely that the ridge or contour 602 could have also entered one of sectors 0 or 6 as well. These three sector pairs can be developed for any contour trajectory. For instance, the three sector pairs could include one of the following pairs: [6, 7, 0], [7, 0, 1], [0, 1, 2,], [1, 2, 3], [2, 3, 4], [3, 4, 5], [4, 5, 6] and [5, 6, 7]. Generally, the pairs include a left, center and right digit, which describe the sectors the contour 602 enters. The left digit represents a counterclockwise change in trajectory, the center digit represents no change in trajectory and the right digit represents a clockwise change in trajectory. By determining a trajectory, one of the previously listed pairs is selected.

After a trajectory is determined, the modified chain coding scheme 500 evaluates the eight pixel neighborhood of a current pixel that has been encoded to determine whether the next pixel of the contour, such as contour 602, has entered the left, center or right digit of the pair selected based on the trajectory. At step 508, it is determined whether the next pixel is within one of the predictable sectors defined by the sector pairs listed above. If the next pixel is within the predictable sectors, then that pixel is encoded using two bits of data at step 510. Two bits of data are required to determine which of the left, center or right digits of the selected pair contains the next pixel. In certain embodiments, the left, center or right digit are encoded using 01, 00 and 10, respectively. After encoding the pixel with two bits, the next pixel is changed to the current pixel and the modified chain coding scheme 500 proceeds back to step 506.

If it is determined, at step 508, that the next pixel is not within one of the left, right or center digits of the selected pair, then the modified chain coding scheme 500 encodes the next pixel using four bits of data at step 512. At step 514, the modified chain coding scheme 500 treats the next pixel as a starting pixel and proceeds back to step 504 of the modified chain coding scheme 500. In this regard, the encoding process begins again with the new trajectory. In certain embodiments, the pixel not being within one of the predictable sectors is marked by entering a 11 in the coded data to indicate that the contour has taken an unpredictable turn.

Figure 7:
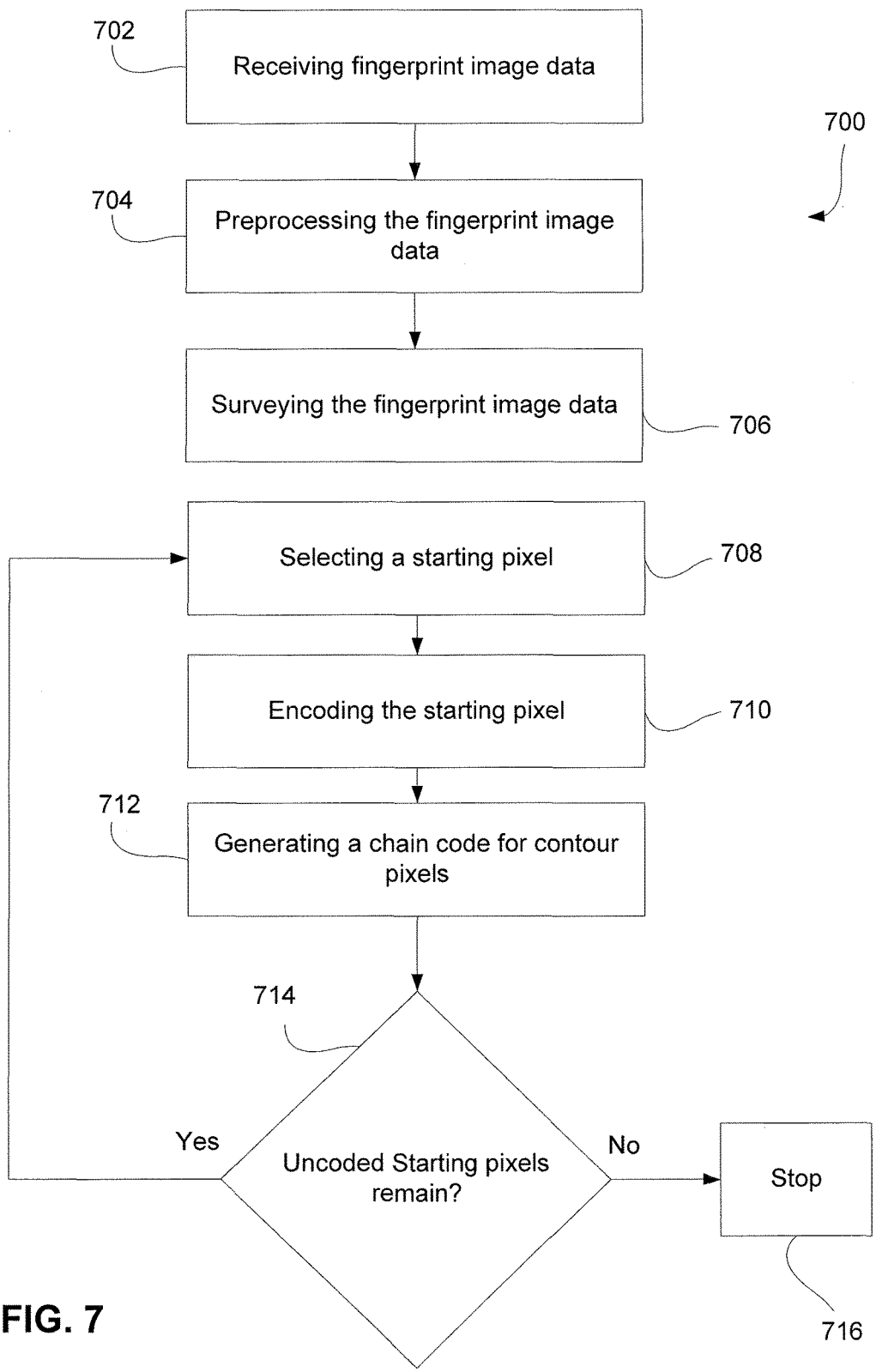
FIG. 7 is a method of encoding an individual view of a fingerprint template, in accordance with an embodiment of the invention.

FIG. 7 illustrates a process of encoding a fingerprint template 700 performed by a processing system such as the processing system 100 illustrated in FIG. 1. At step 702, the processing system 100 receives fingerprint image data from the sensor 102. The fingerprint image data can be representative of either a partial or a full image of a fingerprint. At step 704, the processing system 100 preprocesses the fingerprint image data to create a fingerprint template. In certain embodiments, this includes converting the fingerprint image data to thin-ridge fingerprint image data.

At step 706, the process of encoding a fingerprint template 700 surveys the fingerprint template data to determine a number of neighbors for each pixel or in other words point in the fingerprint image data. By performing this step, the process of encoding a fingerprint template 700 is able to determine which pixels to utilize as starting pixels. By reviewing an eight-pixel neighborhood for each pixel to determine a number of neighbors, the process of encoding a fingerprint template 700 is able to determine a type of pixel such as bifurcation pixels (wherein multiple ridges meet), ending pixels (the beginning or end of a single ridge), a ridge pixel, an isolate pixel or a background pixel. In certain embodiments, the process of encoding a fingerprint template 700 determines the pixel is a bifurcation pixel if it has more than two neighbors, an ending pixel if it has only one neighbor, a ridge pixel if it has two neighbors, an isolated pixel or a background pixel if it has no neighbors. Using the surveyed data, in certain embodiments, each pixel is replaced by the number of neighbors in order to indicate what type of pixel it represents. In certain embodiments, this process determines a number of minutia points such as bifurcation pixels, ending pixels and isolated pixels for subsequent use as starting pixels for the modified chain coding scheme 500 (see FIG. 5).

At step 708, the process of encoding a fingerprint template 700 selects a starting point or in other words staring pixel from the surveyed data from step 706. In certain embodiments, the starting pixels are selected such that all bifurcation pixels contained within the fingerprint template data are selected first, the ending pixels (represent isolated ridges) are selected subsequent to the bifurcation pixels and the isolated pixels are selected last. This order reduces the number of starting pixels needed to encode the fingerprint template data. By selecting the bifurcation pixels first, all ridges connected to the bifurcation pixel are collected utilizing only that one starting pixel. If only a first ridge is collected from a bifurcation pixel, then any remaining ridges that were part of the bifurcation pixel would be considered ending pixels and require encoding an unnecessary starting point, which is undesirable because it would require more data than necessary. After encoding all ridge data associated with bifurcation pixels, the ending pixels, which represent isolated ridges of the fingerprint, are encoded as starting pixels. Finally, in certain embodiments requiring lossless encoding, isolated pixels are encoded. In other embodiments where lossy encoding is sufficient, the isolated pixels will be discarded. Typically, any background pixels will be discarded.

At step 710, the process of encoding a fingerprint template 700 encodes the starting pixel. As previously discussed this takes two bytes of data. Subsequent to encoding the starting pixel, the process of encoding a fingerprint template 700 generates a chain code utilizing the modified chain coding scheme 500 (see FIG. 5) at step 712. At step 714, the process of encoding a fingerprint template 700 checks whether there are remaining starting pixels to be encoded. If there are no remaining starting pixels, then the process 700 stops at step 716. However, if there are remaining starting pixels, then the process 700 returns to step 708 to select the next starting pixel. In this regard, the process 700 encodes all bifurcation starting pixels and their associated ridge pixels first, all isolated ridges subsequently, and, in certain embodiments requiring lossless encoding, all isolated pixels last.

A further benefit, beyond saving memory for storage of the fingerprint image, is that the process of encoding a fingerprint template 700 provides privacy for the user. By encoding the data as described above, the encoded and compressed fingerprint template will have no discernible information without first applying a decoding process to the encoded fingerprint template data.

Additionally, in certain situations, the above described data compression process 700 may not be effective in compressing data beyond historically employed compression processes. This is caused by certain factors, one of which is, in certain embodiments, using two bytes of data to store the starting points. In historically employed compression processes, starting points may be encoded using only one byte of data. Accordingly, when a fingerprint image captured by the sensor 102 (see FIG. 1) is encoded, if the fingerprint image contains a larger than usual number of short ridges or isolated pixels, then the encoding process will be required to encode a larger than usual number of starting pixels, which, in certain embodiments, uses two bytes of data. For instance, if the sensor 102 captures a fingerprint image with a large amount of noisy pixels, then there may be a large number of isolated pixels and/or short ridges.

In situations where the captured fingerprint image contains a larger than usual number of short ridges or isolated pixels, the process of encoding a fingerprint template 700 is no longer used. Rather, other techniques, such as a bits-for-bytes compression, may be used to encode the data. These other techniques are not as heavily affected by the larger than usual number of short ridges or isolated pixels. In certain embodiments, the transition to the other encoding techniques will occur based on a compression ratio threshold being exceeded. In certain embodiments, this compression ratio threshold may be reached when the encoded image reaches an 8:1 compression threshold.

Figure 8:
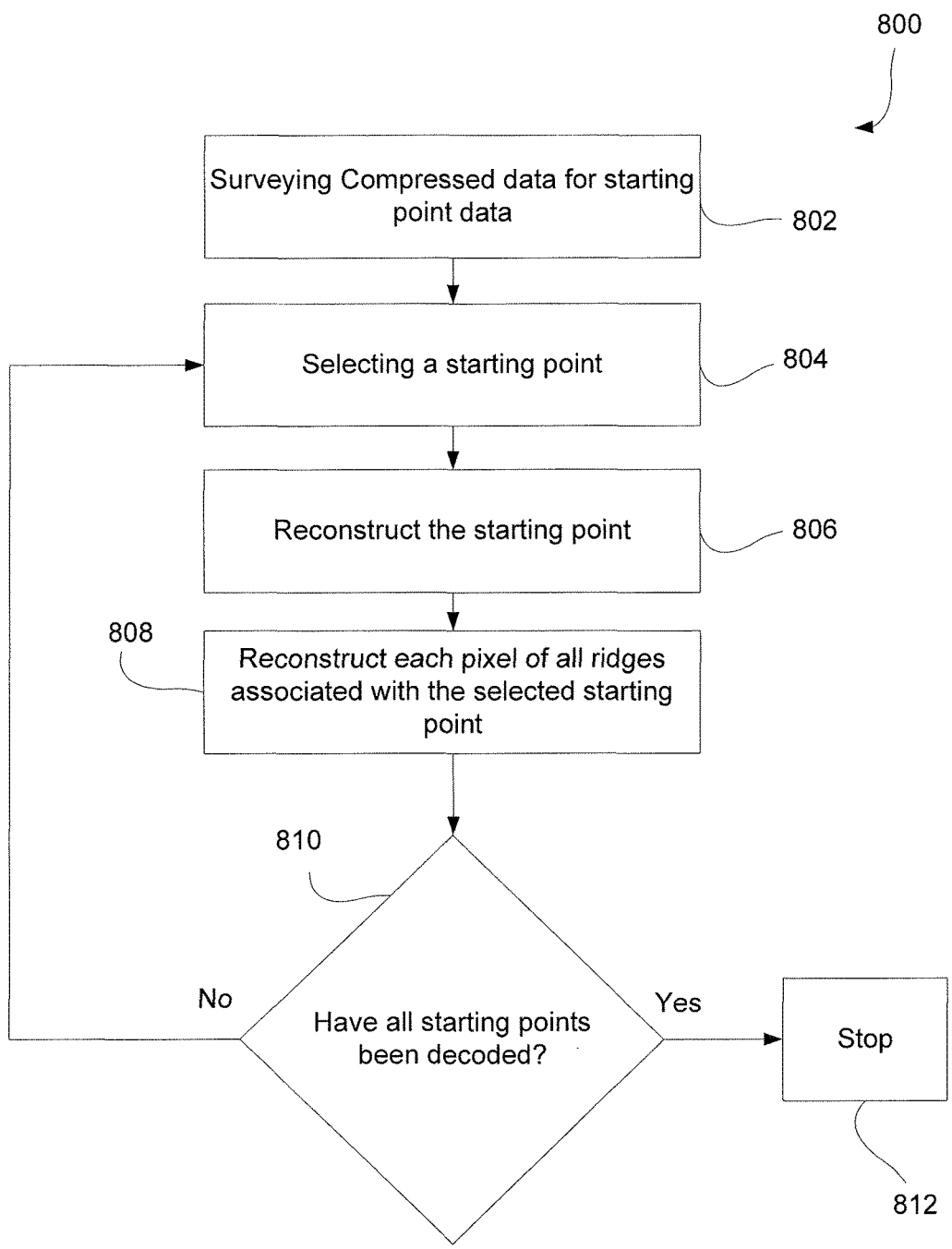
FIG. 8 is a method of decoding the individual view of the fingerprint template encoded using the method of FIG. 7, in accordance with an embodiment of the invention.

FIG. 8 illustrates a process 800 for decoding the fingerprint template encoded using the process of FIG. 7. At step 802, the encoded fingerprint template data is surveyed for starting point data. In certain embodiments, starting point data is represented by two bytes of data utilized to define the starting point. Subsequent to surveying the encoded fingerprint template data, the process 800 selects a starting point for decoding at step 804. In certain embodiments, the starting point is selected based on a numerical order in which the starting point appears in the encoded data. In this regard, the first surveyed starting point will be selected first, and the second starting point will be selected second and so on until the decoding process is finished.

At step 806, the process 800 proceeds to decode the starting point, and at step 808 the process 800 reconstructs the data associated with the starting point that represents the pixels forming the ridge of the fingerprint. In embodiments where each pixel associated with a ridge or contour attached to the starting point or in other words starting pixel are encoded using two bits, the process 800 will decode each pixel of the ridge using the associated two bit coding scheme discussed above regarding FIGS. 5 and 7. In this regard, each pixel is reconstructed based on decoding two bit increments of data subsequent to the selected starting point until all data for the specific ridge has been decoded.

After completion of the decoding process for a ridge is complete, the process 800 proceeds to step 810, which determines whether all starting points surveyed during step 802 have been decoded. If all starting points have been decoded, then the process 800 stops at step 812. However, if all of the starting points have not been decoded, the process 800 proceeds back to step 804 to select the next starting point and associated ridge or ridges to decode. After the completion of the process 800, the decoded fingerprint template may be utilized in a pattern matching process with a recently captured fingerprint image from the sensor 102 (see FIG. 1).

While aspects of this disclosure have been described with respect to fingerprint template compression, techniques describes above can also be used to encode other biometric images, particularly those represented as a skeletonized contour image. For example, techniques described herein could be applied to other biometric pattern images, such as vein patterns, which include eye vein patterns, hand vein patterns, and the like.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of compressing a fingerprint template, the fingerprint template being derived from fingerprint image data captured from a sensor, the method comprising:
    surveying the fingerprint template to determine one or more starting points;
    selecting a starting point from the one or more starting points;
    encoding the starting point;
    encoding one or more contours extending from the starting point; and
    repeating the selecting, encoding the starting point and encoding the one or more contours extending from the starting point steps for each of the one or more starting points surveyed from the fingerprint template,
    wherein the surveying step comprises marking a bifurcation point as one of the one or more starting points,
    wherein the surveying step comprises marking a contour ending as one of the one or more starting points, and
    wherein the step of selecting the starting point comprises:
        initially selecting the bifurcation point as the starting point, and
        selecting the contour ending as the starting point subsequent to selecting the bifurcation point.

2. The method of claim 1, wherein the step of encoding the one or more contours comprises generating a modified chain code encoding the one or more contours.

3. The method of claim 1, wherein the step of encoding the one or more contours comprises generating a run-length code encoding the one or more contours.

4. The method of claim 1, further comprising discarding isolated points in the fingerprint template.

5. The method of claim 1, wherein the step of encoding the one or more contours extending from the starting point comprises:
    initially encoding all contours extending from the bifurcation point,
    encoding a contour extending from the contour ending subsequent to the contours extending from the bifurcation point, and
    encoding isolated points of the fingerprint template subsequent to the contour extending from the contour ending.

6. A device for compressing a fingerprint template, the fingerprint template being derived from fingerprint image data captured from a sensor, the device comprising:
    a processor of a processing system, the processor configured to perform an encoding process comprising:
        surveying the fingerprint template to determine one or more starting points;
        selecting a starting point from the one or more starting points;
        encoding the starting point;
        encoding one or more contours extending from the starting point; and
        repeating the selecting, encoding the starting point and encoding the one or more contours extending from the starting point steps for each of the one or more starting points surveyed from the fingerprint template,
    wherein the surveying step comprises marking a bifurcation point as one of the one or more starting points,
    wherein the surveying step comprises marking a contour ending as one of the one or more starting points, and
    wherein the step of selecting the starting point comprises:
        initially selecting the bifurcation point as the starting point, and
        selecting the contour ending as the starting point subsequent to selecting the bifurcation point.

7. The device of claim 6, wherein the step of encoding the one or more contours comprises generating a modified chain code encoding the one or more contours.

8. The device of claim 6, wherein the step of encoding the one or more contours comprises generating a run-length code encoding the one or more contours.

9. The device of claim 6, wherein the encoding process further comprises discarding isolated points in the fingerprint template.

10. The device of claim 6, wherein the step of encoding the one or more contours extending from the starting point comprises:

initially encoding all contours extending from the bifurcation point, encoding a contour extending from the contour ending subsequent to the contours extending from the bifurcation point, and encoding isolated points of the fingerprint template subsequent to the contour extending from the contour ending.

11. A non-transitory computer readable storage device for compressing a fingerprint template, the fingerprint template being derived from fingerprint image data captured from a sensor, the non-transitory computer readable storage device having computer executable instructions for performing the steps of:

surveying the fingerprint template to determine one or more starting points;

selecting a starting point from the one or more starting points;

encoding the starting point; and encoding one or more contours extending from the starting point, wherein the surveying step comprises marking a bifurcation point as one of the one or more starting points;

wherein the surveying step comprises marking a contour ending as one of the one or more starting points; and wherein the step of selecting the starting point comprises:
      initially selecting the bifurcation point as the starting point, and
      selecting the contour ending as the starting point subsequent to selecting the bifurcation point.

12. The non-transitory computer readable storage device of claim 11, wherein the step of encoding the one or more contours extending from the starting point comprises:

initially encoding all contours extending from the bifurcation point, encoding a contour extending from the contour ending subsequent to the contours extending from the bifurcation point, and encoding isolated points of the fingerprint template subsequent to the contour extending from the contour ending.

\* \* \* \* \*